Patented Sept. 11, 1928.

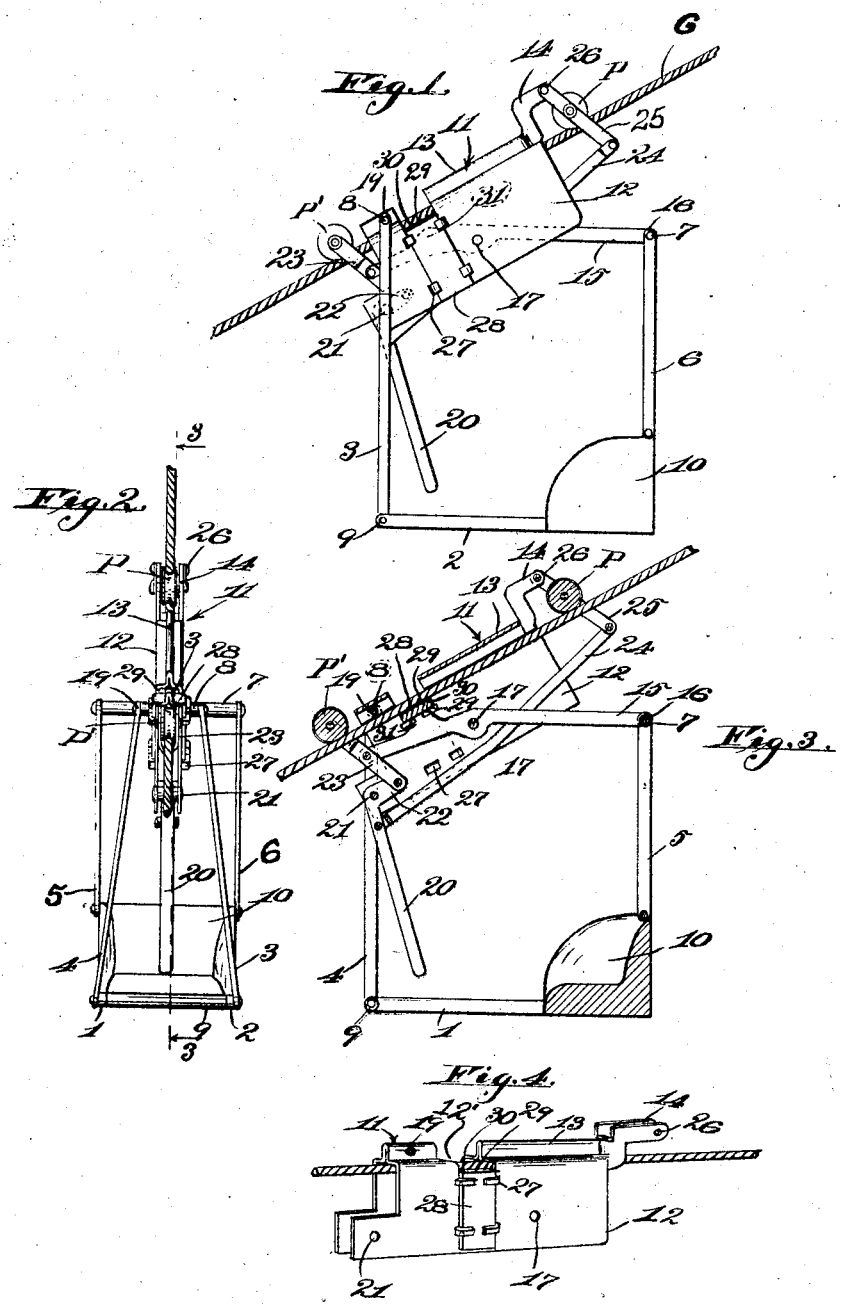

1,684,251

UNITED STATES PATENT OFFICE.

CHARLES E. THOMAS, OF LONG BEACH, CALIFORNIA.

SAFETY CARRIAGE FOR DERRICKS.

Application filed February 24, 1927. Serial No. 170,661.

This invention relates to safety carriages for derricks. Occasionally in oil-well drilling a blow-out occurs and workmen on the rig are often unable to clear the same in time to avoid the blow-out. This very often results in injury and sometimes death to the workmen, and it is therefore an object of this invention to provide a safety carriage which will convey the workmen from a point upon the rig to the ground at a point of considerable distance away.

A further object of my invention is to provide a safety carriage which is suspended from one of the guy ropes on the rig, and which is adapted to travel on the same.

A still further object of my invention is to provide a safety carriage on which there is provided a brake that will enable the operator to retard the speed of the carriage as it approaches an object that might be in its path, or as it approaches the ground.

A still further object of this invention is to provide a safety carriage which is strong and durable, which may be manufactured at a comparatively small cost and which is unlikely to get out of order, which is dependable and well adapted to perform the services required of it.

With the foregoing and other objects in view which will be made manifest in the following detailed description and specifically pointed out in the appended claims, reference is had to the accompanying drawings for an illustrative embodiment of the invention, wherein:

Figure 1 is a side view of the safety carriage suspended from one of the guy ropes.

Figure 2 is an end view of the device shown in Figure 1.

Figure 3 is a sectional view taken along the line 3—3 of Figure 2.

Figure 4 is a view of the actual brake mechanism employed in connection with my invention.

The invention consists of the novel parts hereinafter described in this specification and illustrated in the accompanying drawings in which like characters of reference designate like parts throughout. My improved safety carriage comprises a substantially rectangular frame having side bars 1 and 2, substantially vertical front bars 3 and 4, vertical rear bars 5 and 6 and cross stays 7, 8 and 9 respectively, and mounted in one corner of this frame is a seat 10 which serves the purpose of a cross-bar. The chassis is designated as an entirety at 11, and this chassis is of the suspension type and comprises a subtantially U-shaped piece of frame work 12 having a longitudinal bead 13 on its upper surface, which bead is extended to provide a reversed U-shaped bracket 14. A lever 15 is pivoted as at 16 to the cross stay 7 at a point intermediate its end, and the upper end of the vertical front bars 3 and 4 are pivoted to the cross stay 8 as at 19, which cross stay extends into the frame work 12. The lever 15 is pivoted as at 17 to the frame work 12, and the points 17 and 19 are the three points of suspension of the carriage. As there are no cross braces, the carriage is capable of distortion as it swings, and thus at all times it remains vertical. A hand lever 20 is pivoted as at 21 to the chassis. This lever has a bell-crank arm 22 pivoted to a U-shaped bracket 23, which bracket is pivoted intermediate its ends to the end of the lever 15. Pivoted to the lever 20 below its pivotal connection 21 is a long lever 24, the end of which is pivoted to a pair of links 25, which links in turn are pivoted as at 26 to the first mentioned bracket 14. The bracket 23 and the links 25 have mounted therein for rotation, pulleys P and P', which pulleys rest on the guy rope and this completes the actual flexible structure which comprises my improved safety carriage.

A brake is formed on the chassis. A cut-out portion 12' is formed on the chassis, and on either side of the same there are formed lugs 27. A brake is provided in the form of an inverted U, the legs of which comprise the blocks 28 slidably retained upon the chassis 11 by the lugs 27, and connected by the brake band 29, having a lining 30 thereon. This lining may be of any suitable material which has frictional resistance with the steel of the guy rope such as asbestos fabric or the like. A lug or projection 31 is formed on the lever 15, and has an operative connection with the brake to operate the same.

I will now describe the operation of my device in detail, and show the manner in which the various levers, links and pivot points serve to operate the brake on my carriage. When a blow-out occurs in the well, the workmen are given a comparatively short period of time before the actual danger is encountered, and it is within this period of time that the rig must be cleared.

The length of time varies of course, in accordance with the depth of the well, but it is rarely more than three or four minutes from the time the danger signal is sensed before the actual blow-out occurs, and my improved safety carriage will travel from the rig to the ground in far less than this period. The operator climbing into the carriage, releases the brake and the carriage by its own mass, travels downwardly along the guy rope G. When the carriage is to be stopped, the operator grasps the lever 20 and pulls the same upwardly. This lever 20 moves the lever 24, and subsequently the links 25. These links swing outwardly, carrying with them the pulley P, and the end of the chassis carrying the pulley P is permitted to rest upon the guy rope. Similarly, the bracket 23 is moved upwardly by the bell-crank 22 and the other end of the chassis is permitted to rest upon the guy rope. At the same time, the lever 15 is partially rotated and the projection 31 having an operative connection with the brake-band, forces the brake-band tightly against the guy rope as shown in Figure 4, and the carriage comes to a stop. A reversal of this operation will permit the carriage to commence its travel. It is obvious then, that I have provided a safety carriage which is of great benefit to humanity, and which lessens the danger associated with blow-outs in oil wells.

I do not desire to limit myself to the exact arrangement of parts shown and described in the drawings and specification, and various changes may be made in the details of construction, without departing from the spirit or scope of the invention as defined by the appended claims.

I claim:

1. A safety carriage comprising in combination a chassis, means for suspending the same from a guy rope, said means comprising pulleys mounted on said chassis, a frame pivoted to said chassis, a brake on said chassis adapted to bear against said guy rope, and means for causing said pulleys to release their engagement with said guy rope.

2. A safety carriage comprising in combination a chassis, pulleys mounted in said chassis adapted to support the chassis upon a guy rope, and means for causing said pulleys to release their engagement with said guy rope.

3. A safety carriage comprising in combination a chassis, pulleys mounted in said chassis adapted to bear against a guy rope, means for causing said pulleys to release their engagement with said guy rope, and additional means for applying pressure to said guy rope to retard the motion of said carriage.

4. A device as claimed in claim 3, said both mentioned means being adapted to be operated simultaneously by a single operation.

5. A safety carriage comprising in combination a chassis, said chassis being in the form of a U-shaped frame and adapted to be mounted on a guy rope, a lever pivoted intermediate its length to said chassis, one end of said lever being pivoted to a cross stay, depending side bars pivoted to the outer ends of said cross stay, a seat pivoted between the lower ends of said levers, side bars carried by said seat, a cross stay connecting said side bars, upwardly extending front bars, a cross bar connecting the upper ends of said front bars, said cross bar extending into said chassis, a U-shaped bracket carrying a pulley pivoted to the other end of said first mentioned lever, a bell-crank lever having a handle pivoted to said chassis, the bell-crank arm being pivoted to said bracket, a link pivoted to said bell-crank lever, a pair of links pivoted to said last mentioned link and to said chassis, and a second pulley pivoted between said links, a projection on said first mentioned lever and a brake slidably mounted on said chassis, said pulleys being mounted on the guy rope whereby movement of said handle will cause said pulleys to release their engagement with said guy rope and said projection will abut against said brake and cause the same to clamp said guy rope against the chassis.

6. A safety carriage comprising in combination a chassis disposed over a guy rope, a pair of links pivoted to said chassis, a pulley carried by each of said links to support the carriage upon the guy rope, and a lever operatively connected to said links to cause them to turn upon their pivots and drop the chassis upon the guy rope.

7. A safety carriage comprising in combination a link disposed over a guy rope, a pair of links pivoted to said chassis, a pulley carried by each of said links to support the carriage upon the guy rope, a lever operatively connected to said links to cause them to turn upon their pivots and drop the chassis upon the guy rope, and a brake operatively connected to one of said links to be brought into engagement with the guy rope when the carriage is dropped.

In testimony whereof I have signed my name to this specification.

CHARLES E. THOMAS.